US011097797B1

(12) United States Patent
Zeller

(10) Patent No.: US 11,097,797 B1
(45) Date of Patent: Aug. 24, 2021

(54) WHEEL SECURING APPARATUS AND METHOD OF USE

(71) Applicant: Ryan Zeller, Mount Joy, PA (US)

(72) Inventor: Ryan Zeller, Mount Joy, PA (US)

( * ) Notice: Subject to any disclaimer, the term of this patent is extended or adjusted under 35 U.S.C. 154(b) by 336 days.

(21) Appl. No.: 16/366,616

(22) Filed: Mar. 27, 2019

(51) Int. Cl.
  *B62H 3/00* (2006.01)
  *B62K 25/00* (2006.01)
  *B62K 25/02* (2006.01)
  *B62H 3/04* (2006.01)

(52) U.S. Cl.
  CPC ............... *B62H 3/00* (2013.01); *B62H 3/04* (2013.01); *B62K 25/00* (2013.01); *B62K 25/02* (2013.01); *B60G 2300/12* (2013.01)

(58) Field of Classification Search
  CPC ... B62H 3/00; B62H 3/04; B62H 5/06; B62H 5/144; B60G 2300/12; B60P 7/15; B60P 7/135; B60P 3/077
  See application file for complete search history.

(56) References Cited

U.S. PATENT DOCUMENTS

| | | | | |
|---|---|---|---|---|
| 6,065,914 A | * | 5/2000 | Fotou | B60P 3/079 410/100 |
| 6,210,090 B1 | * | 4/2001 | Wyse | B60P 7/15 410/122 |
| 6,390,746 B1 | * | 5/2002 | Huang | B60P 7/15 410/143 |
| 8,002,242 B2 | * | 8/2011 | Lu | B66F 1/04 254/108 |
| 2011/0068568 A1 | * | 3/2011 | Cerezo Lotina | E04G 21/26 285/32 |
| 2016/0339831 A1 | * | 11/2016 | Xiao | F16C 3/03 |

* cited by examiner

Primary Examiner — James A English
Assistant Examiner — Mary E Young
(74) Attorney, Agent, or Firm — Leavitt Eldredge Law Firm

(57) ABSTRACT

A wheel securing apparatus includes a first tube having a plate positioned at a first end; a second tube engaged with the first tube such that the second tube is to extend away from the first tube; a cuff attached to a first end of the second tube and to engage with the wheel; a brace engaged with the first tube; a ratcheting wheel having teeth to engage with a openings associated with the first tube, the ratcheting wheel supported by the brace; and a handle engaged with the ratcheting wheel and to extend the second tube away from the first tube via movement of the teeth with the openings; the plate secures within a wheel guard and the cuff secures to the wheel via pressure created by extending the first tube away from the second tube.

4 Claims, 8 Drawing Sheets

WHEEL SECURING APPARATUS AND METHOD OF USE

BACKGROUND

1. Field of the Invention

The present invention relates generally to securing devices, and more specifically, to a wheel securing apparatus that secures and holds a wheel in place via pressure created with a ratcheting device.

2. Description of Related Art

Recreational vehicles are well known in the art and are effective means of entertainment and fun. Such recreational vehicles include motorcycles, and it is common for users to transport motorcycles in their vehicles to locations for use. During transport, the motorcycle must be secured in place, and this typically involves one or more tie downs secured to a front wheel and securing the motorcycle in place. The process of securing a motorcycle within a vehicle can be particularly challenging for one individual.

Accordingly, it is desirable to have a system and method that utilizes a convenient apparatus for securing a front wheel in a locked position. This will assist a user during securing of the motorcycle within a vehicle for transportation.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
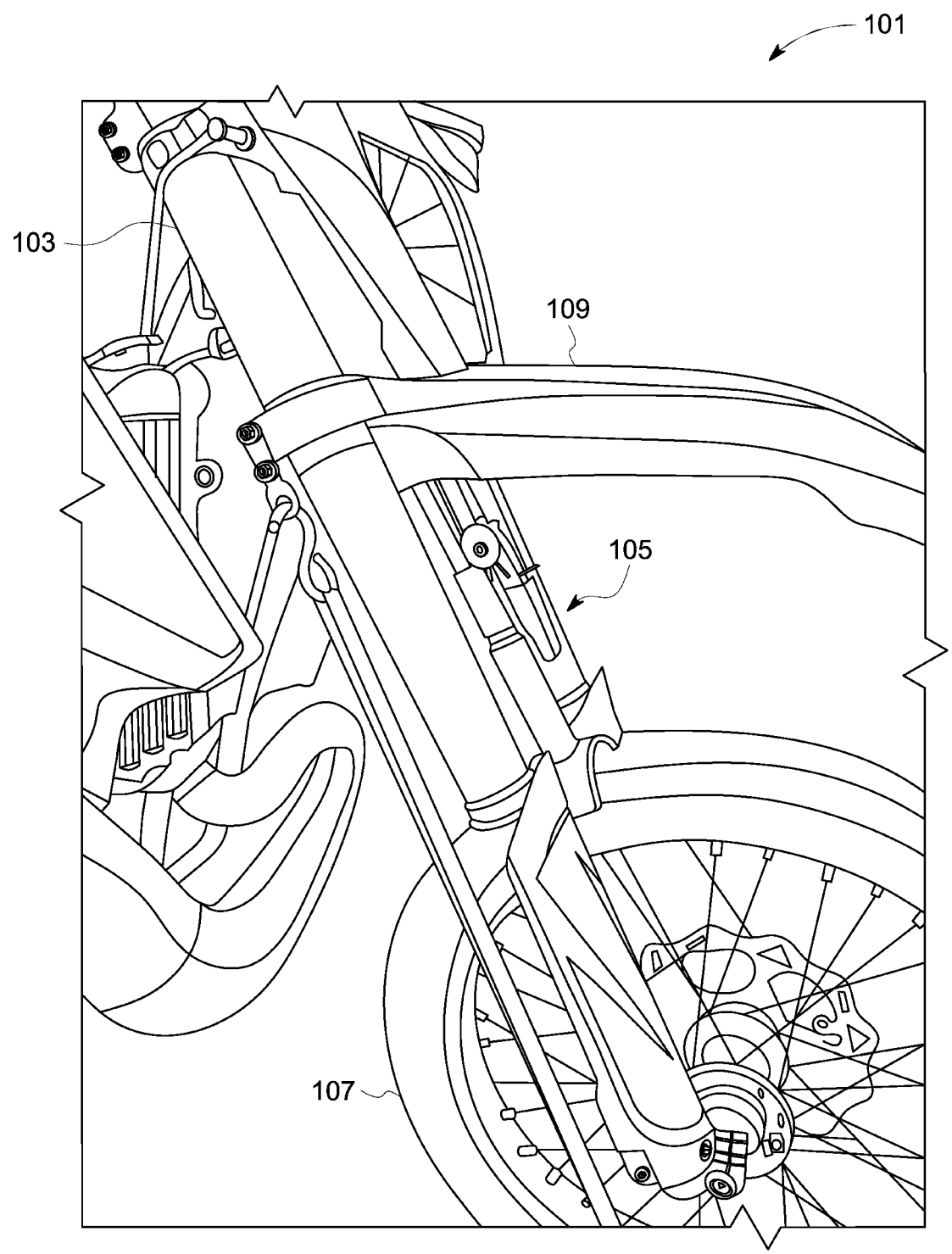
FIG. 1 is a partial view of a motorcycle with a wheel securing apparatus of the present invention in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional motorcycle transportation systems. Specifically, the present invention provides for a quick and convenient way to secure a wheel of a motorcycle. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a partial oblique view of a system 101 with a wheel securing apparatus 105 in accordance with a preferred embodiment of the present application. It will be appreciated that the apparatus 105 provides for a quick means to secure a motorcycle wheel. The apparatus 105 is configured to eliminate the use of a front ratchet strap when loading the motorcycle 103.

As shown, the apparatus 105 is configured to be secured between a wheel guard 109 and a wheel 107. During use, a preset cable (not shown) can be used to slightly secure the motorcycle in place while the apparatus 105 is put into place. When unloading, pressure can be released from the apparatus 105, thereby releasing the motorcycle for unloading. It should be appreciated that the apparatus eliminates the conventional use of a plurality of ratchet straps that cause tangles and delays.

Figure 2A:
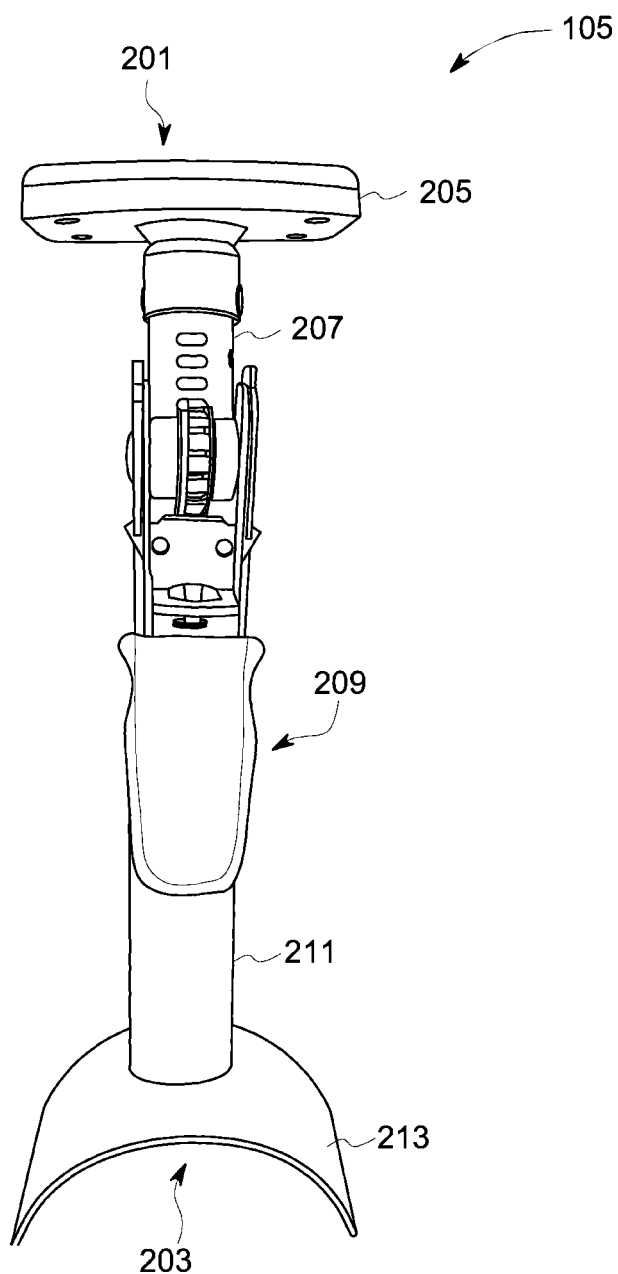
FIG. 2A is a front view of the apparatus of FIG. 1.

In FIG. 2A a front view depicts apparatus 105. Apparatus 105 extends from a first end 201 to a second end 203, wherein a plate 205 is secured to a first tube 207 and a second tube 211 is engaged with the first 207 and further includes a cuff 213. Apparatus 105 further includes a ratcheting device 209 that is configured to extend the two tubes 207, 211 away from one another such that they can form a pressure contact against the wheel and wheel cover of the bike.

It should be appreciated that one of the unique features believed characteristic of the present application is the use of a plate 205 and a cuff 213 with a ratcheting device 209. These structural components provide a means to quickly and efficiently engage between a wheel and a wheel cover, thereby providing a user with an effective means to secure a wheel in place.

Figure 2B:
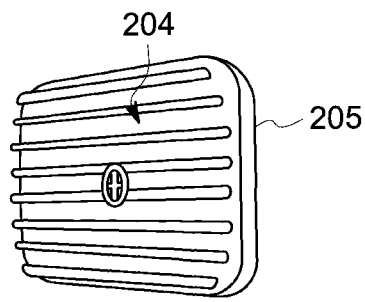
FIG. 2B is a view of the plate of FIG. 2A.

As shown in FIG. 2B, in one contemplated embodiment, the plate 205 is rectangular and can include a surface treatment 204 that could include a plurality of ridges (as shown). The plate 205 can be composed of a rubber, plastic, silicone, or other material that will not damage the wheel guard and will provide for a gripping feature of the plate. It should further be appreciated that the size and shape of the plate can vary while still providing the same functionality.

Figure 3:
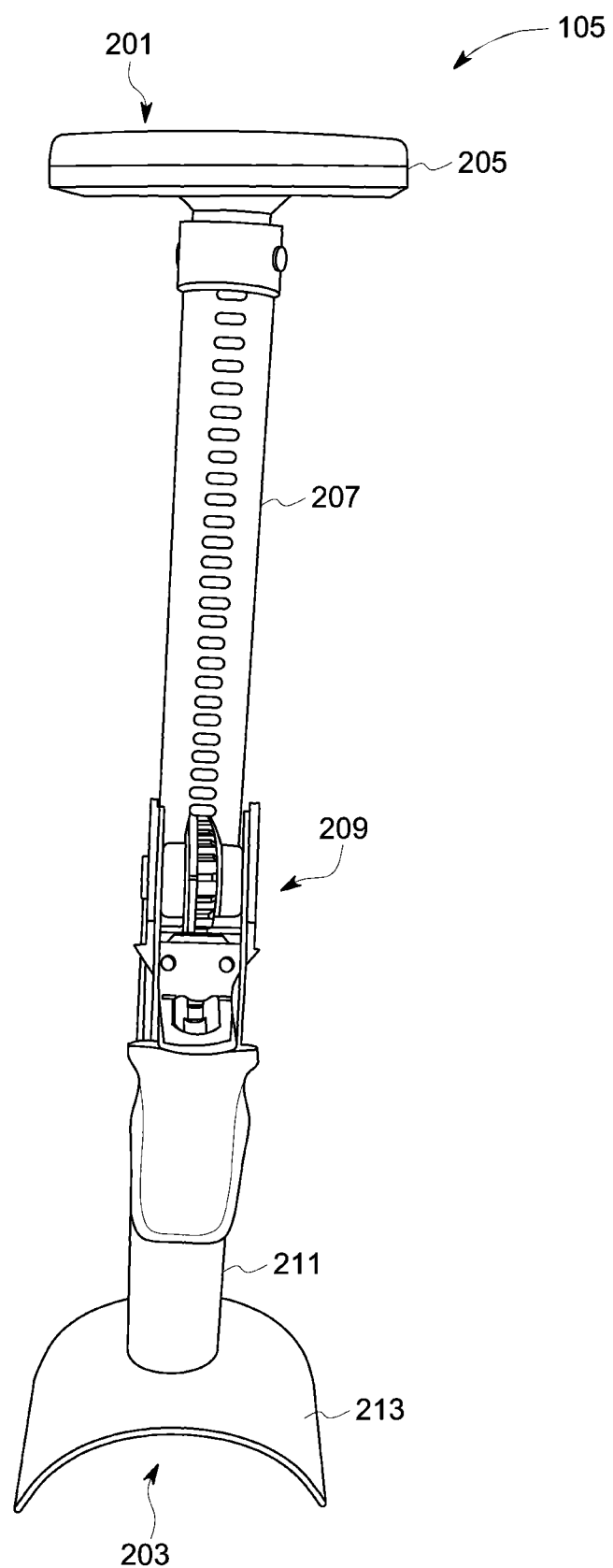
FIG. 3 is a front view of the apparatus of FIG. 1 in an extended position.

In FIG. 3, an extended view of apparatus 105 is shown. As shown, tube 207 is configured to extend away from tube 211 via use of ratcheting device 209. This allows for creation of the pressure hold on the motorcycle wheel.

Figure 4:
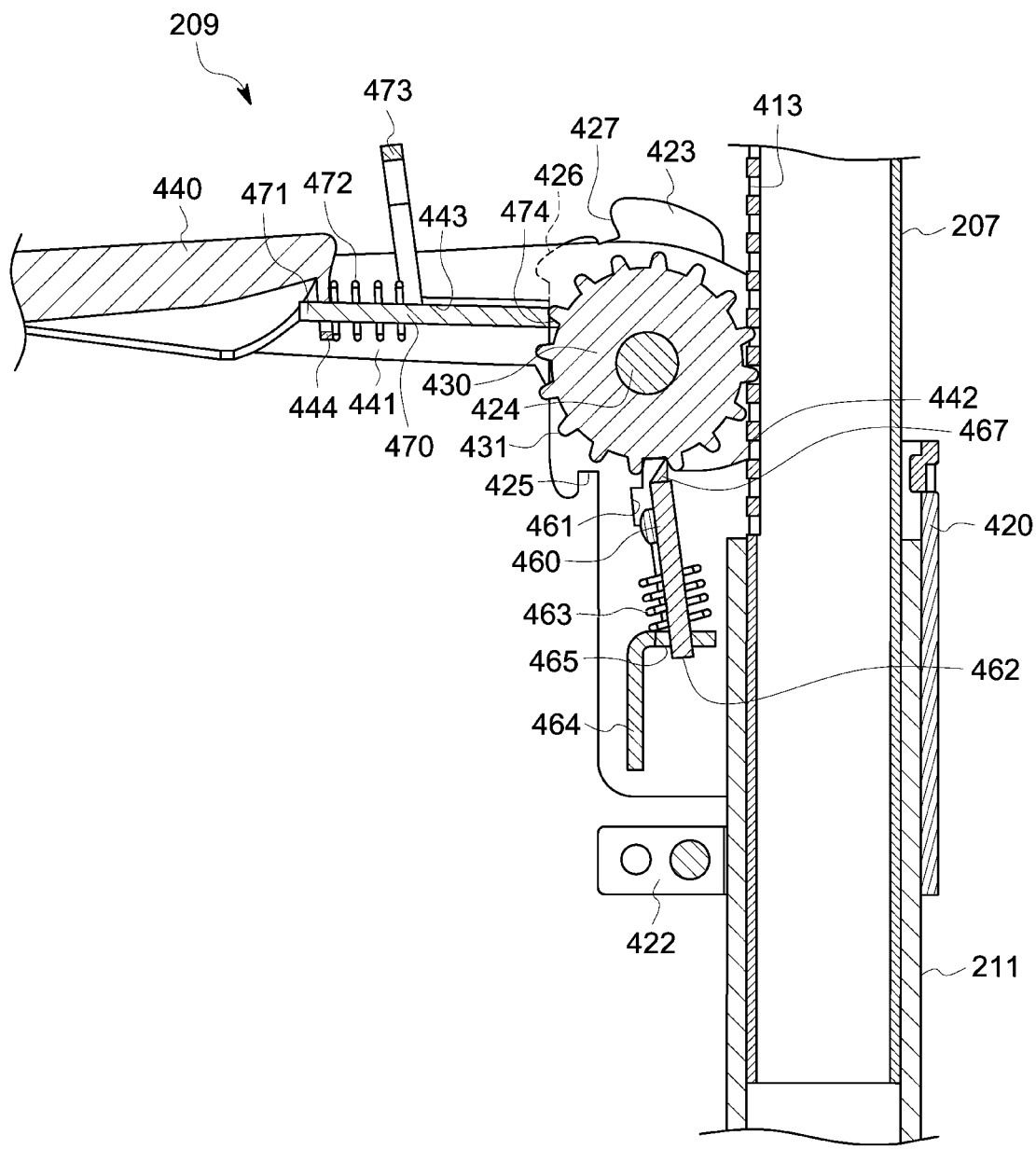
FIG. 4 is a side view of the ratcheting device of the apparatus of the present invention in a first position.
Figure 5:
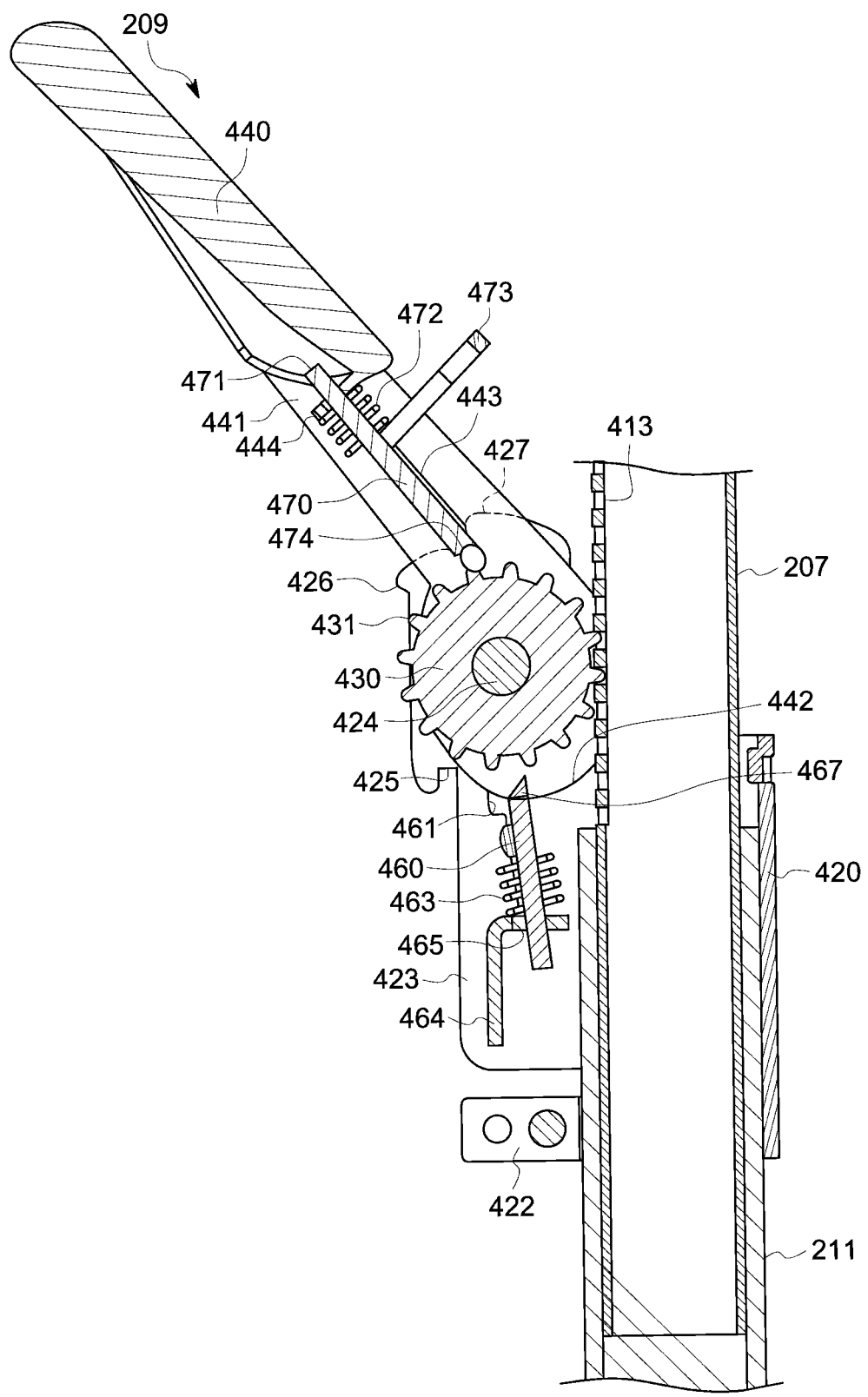
FIG. 5 is a side view of the ratcheting device in a second position.
Figure 6:
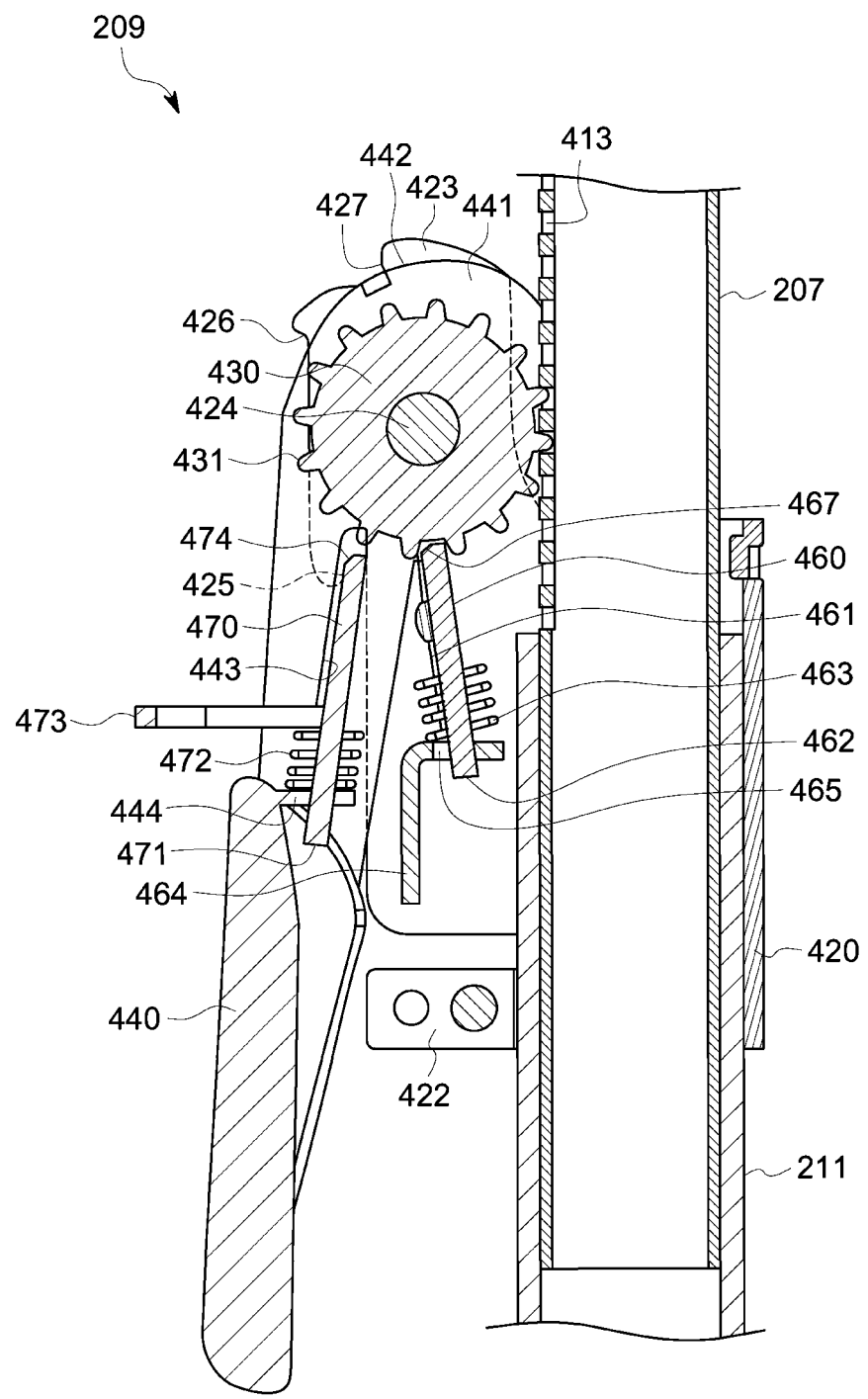
FIG. 6 is a side view of the ratcheting device in a third position.

In FIGS. 4, 5, and 6, the ratcheting device 209 is shown in detail. As shown, device 209 includes a brace 420 configured to secure the device to tube 211 via a mounting element 422, such as a. The brace 420 can vary but provides for structural support to hold the ratcheting device 209 in place.

Device 209 includes a wheel 430 with a plurality of teeth 431, the plurality of teeth 431 configured to align with and engage with a plurality of openings 413 of tube 207. This provides for the movement of tube 207 relative to tube 211. Wheel 430 is engaged with a center 424 for providing rotational movement. A handle 440 is provided to activate the ratcheting movement of the wheel 430. In the preferred embodiment, a plate 423 with one or more locking elements 427, 425 is provided as a part of the ratcheting device, thereby allowing for securing of the handle in an upwards or downwards position, as shown in FIGS. 5 and 6. In addition, a stop 426 is provided for securement.

It is contemplated and should be appreciated that the features described herein could be altered and vary to provide the same functionality of the ratcheting device. One embodiment will be provided herein for clarity and detail.

In one embodiment, the handle 440 can include one or more supports 441 inserted within a grip. The one or more supports can include a slot 443 extending therethrough. The handle 440 can further include one or more cams 442 and one or more protrusions 444. A detent 470 with an insert 471 engaged with a spring 472 and a lug 473 is provided, wherein ratchet 474 aligns with teeth 431.

The system of the present invention can further include a detent 460 located within a slot 461 and the detent 460 can include a ratchet 467 and an insert 462, wherein the ratchet 467 is configured to align with the plurality of teeth 431. An abutment element 464 with an opening 465 can be included. During use, the spring 463 is configured to be compressed between detent 460 and abutment 464.

During use, the handle 440 is configured to be pivoted upwards, wherein ratchet 467 will engage with the plurality of teeth, thereby moving the teeth along the first tube 207. As desired, the handle 440 can be dropped to a downward position, as shown in FIG. 6, wherein the ratchet 467 engages with the wheel 430, again extending the second tube 41 from the first.

When the user desires to disengage the apparatus, the user can lock the handle with locking position 427, wherein the first detent 460 and second detent 470 are unengaged with the wheel, thereby allowing for the wheel to move freely. In this position, the user can merely move the two tubes as desired.

Figure 7:
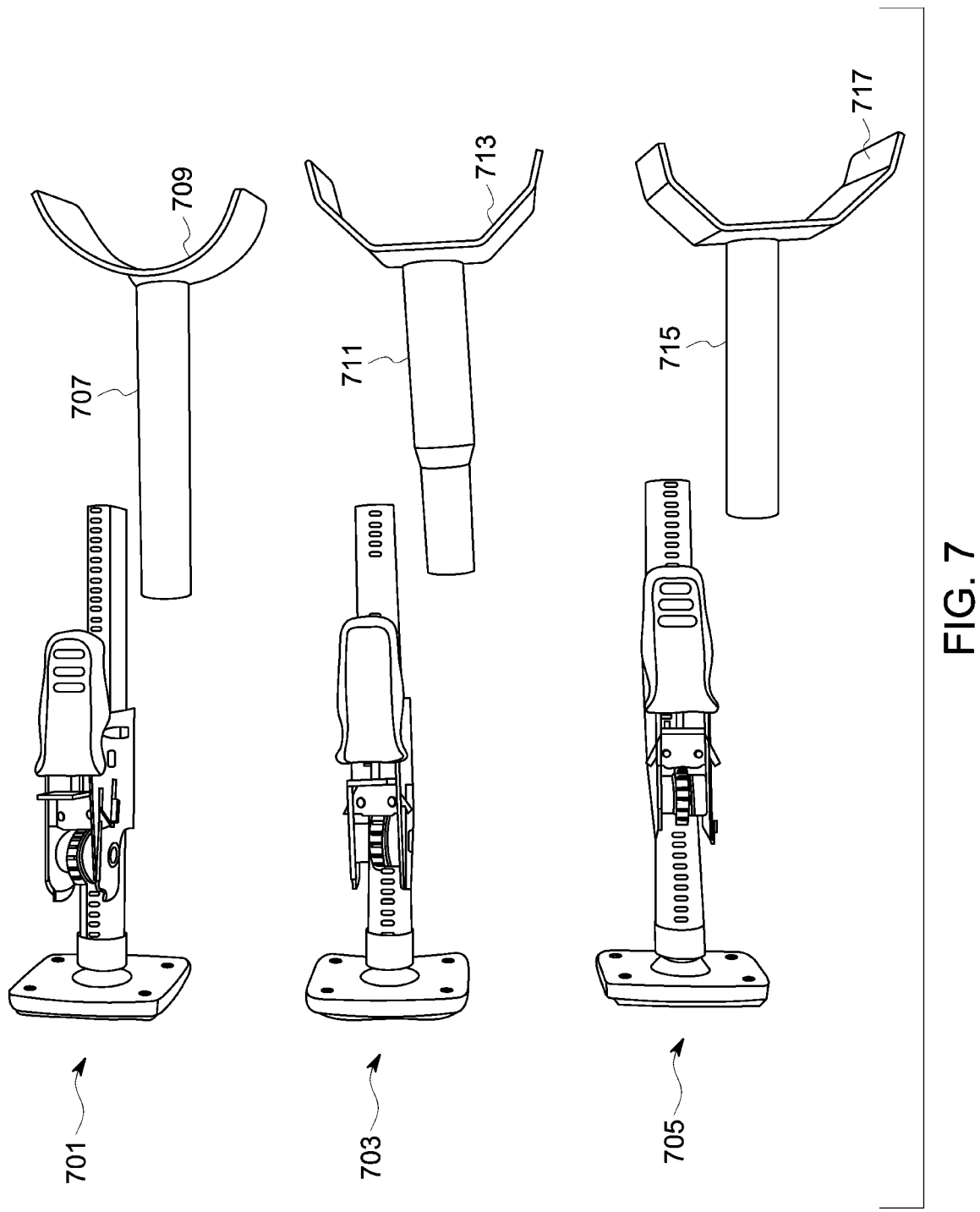
FIG. 7 is a front view of a plurality of embodiments of the apparatus of the present invention with the second tube disconnected.

In FIG. 7, a plurality of embodiments 701, 703, 705 of a wheel securing apparatus are shown. It should be appreciated that minor modifications, as shown, are contemplated. As shown, the second tube 707, 711, 715 can vary in the style of cuff 709, 713, 717. These cuffs will provide the same functionality. It is further contemplated that the cuff could be rectangular or "V" shaped as well.

Figure 8:
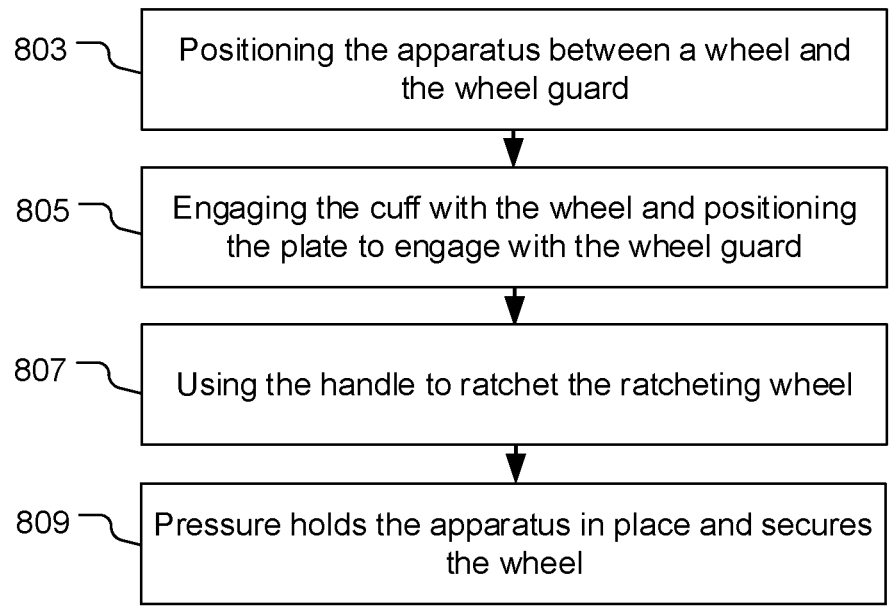
FIG. 8 is a flowchart of the method of use of the apparatus of the present invention.

In FIG. 8, a flowchart 801 depicts a method of use of the apparatus 105. During use, the apparatus is positioned between a wheel and a wheel guard, as shown with box 803. The user can then engage the cuff with the wheel and the plate with the wheel guard, and proceed to use the ratcheting device to apply pressure between the two, as shown with boxes 805, 807, 809.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A wheel securing apparatus, comprising:
   a first tube having a plate positioned at a first end;
   a second tube engaged with the first tube such that the second tube is configured to extend away from the first tube;
   a cuff attached to a first end of the second tube and configured to engage with a wheel;
   a brace engaged with the first tube;
   a ratcheting wheel having a plurality of teeth configured to engage with a plurality of openings associated with the first tube, the ratcheting wheel supported by the brace; and
   a handle engaged with the ratcheting wheel and configured to extend the second tube away from the first tube via movement of the plurality of teeth with the plurality of openings;
   wherein the plate secures within a wheel guard and the cuff secures to the wheel via pressure created by extending the first tube away from the second tube.

2. The apparatus of claim 1, wherein the plate is a rubber plate with a textured surface.

3. The apparatus of claim 1, wherein the cuff is metal and integral with the second tube.

4. A method of securing a wheel, the method comprising:
   providing the apparatus of claim 1;
   engaging the cuff with the wheel;
   positioning the plate to engage with the wheel guard; and
   extending the first tube away from the second tube such that pressure holds the apparatus in place and secures the wheel.

* * * * *